United States Patent

Rignell et al.

[11] Patent Number: 5,818,920
[45] Date of Patent: Oct. 6, 1998

[54] APPARATUS FOR CONTROLLING COMMUNICATION CONNECTIONS BASED ON LOCAL TIME

[75] Inventors: Mårten Rignell, Dalby; Johan Sjödahl, Hjärup, both of Sweden; Henrik Snellman, Helsinki, Finland

[73] Assignee: Telefonaktiebolaget LM Ericsson, Stockholm, Sweden

[21] Appl. No.: 759,182

[22] Filed: Dec. 4, 1996

[51] Int. Cl.$^6$ .................................................. H04M 3/42
[52] U.S. Cl. .................. 379/211; 379/188; 379/196; 379/200; 379/210; 379/229; 455/422; 455/433; 455/445; 368/10; 368/13; 368/21
[58] Field of Search .................. 379/210, 211, 379/219, 220, 221, 229, 265, 266, 309, 188, 196, 197, 198, 199, 200; 455/422, 432, 433, 445; 368/10, 13, 21

[56] References Cited

U.S. PATENT DOCUMENTS

| | | | |
|---|---|---|---|
| 4,313,186 | 1/1982 | Yoshida | 368/22 |
| 4,611,094 | 9/1986 | Asmuth et al. | 379/201 |
| 4,644,347 | 2/1987 | Lucas et al. | 340/825.04 |
| 4,669,891 | 6/1987 | Rosevear | 368/21 |
| 4,887,251 | 12/1989 | Takada | 368/21 |
| 4,893,336 | 1/1990 | Wuthnow | 379/211 |
| 4,991,204 | 2/1991 | Yamamoto et al. | 379/221 |
| 5,027,387 | 6/1991 | Moll | 379/112 |
| 5,210,789 | 5/1993 | Jeffus et al. | 379/127 |
| 5,216,709 | 6/1993 | Wen et al. | 379/354 |
| 5,258,964 | 11/1993 | Koma et al. | 368/47 |
| 5,309,500 | 5/1994 | Koma et al. | 455/550 |
| 5,329,578 | 7/1994 | Brennan et al. | 379/67 |
| 5,337,352 | 8/1994 | Kobayashi et al. | 379/234 |
| 5,375,104 | 12/1994 | Ishii et al. | 368/22 |
| 5,436,965 | 7/1995 | Grossman et al. | 379/266 |
| 5,467,388 | 11/1995 | Redd, Jr. et al. | 379/196 |
| 5,528,558 | 6/1996 | Mardhekar et al. | 368/10 |
| 5,537,469 | 7/1996 | Beniston et al. | 379/229 |
| 5,590,188 | 12/1996 | Crockett | 379/225 |
| 5,734,709 | 3/1998 | DeWitt et al. | 379/207 |

FOREIGN PATENT DOCUMENTS

| | | |
|---|---|---|
| 0 400 911 A | 12/1990 | European Pat. Off. . |
| 0516124 A2 | 12/1992 | European Pat. Off. . |
| 2 234 883 | 2/1991 | United Kingdom . |
| 2284965 | 6/1995 | United Kingdom . |

OTHER PUBLICATIONS

Patent Abstracts of Japan, vol. 013, No. 594 (E–867), 27 Dec. 1989 & JP 01 248858 A (Omron Tateisi Electron Co.), 4 Oct. 1989.

Patent Abstracts of Japan, vol. 016, No. 307 (E–1229), 7 Jul. 1992 & JP 04 084550 A (Oki Electric Ind. Co. Ltd.) 17 Mar. 1992.

Patent Abstracts of Japan, vol. 017, No. 287 (E–1374), 2 Jun. 1993 & JP 05 014489 A (Masushita Electric Ind. Co. Ltd.) 22 Jan. 1993.

Japanese Abstract of Application No. 3–226377 (Matsushita Electric Ind. Co. Ltd.), Aug. 1991.

*Primary Examiner*—Ahmad F. Matar
*Assistant Examiner*—Scott Wolinsky
*Attorney, Agent, or Firm*—Burns, Doane, Swecker & Mathis, L.L.P.

[57] ABSTRACT

A method and system for preventing calls in a telecommunications network from being connected during specified periods of time, such as when calls to the desired communication terminal have been forwarded to a new communication terminal in a new time zone and the subscriber at the calling communication terminal is unaware of the local time of the new communication terminal. According to the invention, a prevention device is provided which informs the calling communication terminal of the local time of the new communication terminal prior to connection and requests the calling communication terminal to confirm whether the communication connection should be made, or automatically prevents the connection from being made and informs the calling communication terminal that the connection will not be made. The telecommunications network can include mobile telecommunications devices.

29 Claims, 4 Drawing Sheets

APPARATUS FOR CONTROLLING COMMUNICATION CONNECTIONS BASED ON LOCAL TIME

FIELD OF THE INVENTION

The invention relates to telecommunications systems and, in particular, to telecommunications systems in which calls may be forwarded from one subscriber location to another subscriber location.

BACKGROUND OF THE INVENTION

In a Public Switched Telephone Network, PSTN, subscribers may forward incoming calls from one communication terminal to another. For example, if a first subscriber at terminal A calls a second subscriber at terminal B, and the second subscriber has forwarded his incoming calls from terminal B to terminal C, the PSTN will connect the call from terminal A to terminal C and not to terminal B. The terminals may be located in different time zones corresponding to different local times.

In a Public Land Mobile Network, PLMN, subscribers are connected via mobile stations. A PLMN comprises a number of base stations with which mobile stations may be connected. The base stations may be located in different time zones corresponding to different local times.

A problem associated with the above communication systems in which calls can be forwarded can be described as follows. When the first subscriber in a first time zone calls a second subscriber who has forwarded incoming calls from an original terminal to a new terminal in a different time zone, the first subscriber may be unaware of the local time of the time zone of the subscriber where his call will end up, that is the local time corresponding to the time zone of the new terminal. The first subscriber may then, unknowingly, place a call to the second subscriber at an awkward time of the day (e.g., 2:00 a.m.) for the second subscriber.

A second problem is that a subscriber calling from a first time zone corresponding to a first local time to a mobile station may be unaware about the local time of the time zone where the called mobile station is currently located. The subscriber may then, unknowingly, place a call to the mobile station at an awkward time of day, (e.g., 2.00 a.m.).

A third problem is that a subscriber may be disturbed by incoming calls from other subscribers of the communication system who are placing their calls at awkward times of the day due to the difference in local time between the calling subscribers and the called subscriber.

To overcome problems relating to time zone differences between calling parties and called parties, several solutions have been suggested. For example, European Patent Application 0 516 124 A2 by Maeda (Maeda) discloses a telephone provided with a memory for storing names, numbers, and time information. To place a call, a name is input to the telephone, a searching circuit determines the telephone number and time associated with the name input into the telephone, and the name, telephone number, and local time of the party to be called is displayed to the user. Thus, in the Maeda system, it is encumbent upon the user to consult the memory by inputting the name of the party to be called. Maeda does not disclose any means for updating the memory if the party to be called is associated with a mobile telephone which moves between different time zones, or if the party to be called has forwarded calls to another location. Maeda further does not disclose any means for preventing a call inadvertantly placed at an undesirable time if the memory is not consulted. Therefore, the Maeda system does not adequately prevent the connection of calls during undesirable periods of time.

U.S. Pat. No. 5,375,104 to Ishii et al. (Ishii) discloses a system for automatically displaying the local time of the geographic area in which a communication device (e.g., a mobile telephone) is located. Ishii does not suggest any means for determining the local time of a telephone to be called, nor any means for inhibiting calls from being connected to a mobile telephone, or to a telephone subscriber who has forwarded calls from one telephone to another, at an undesirable time.

UK Patent Application GB 2 294 965 A by Seppo (Seppo) discloses a system for automatically providing a telephone user of a first telephone with the time of day within the geographical area of a second telephone. The telephones can be mobile telephones. However, Seppo does not disclose any means for preventing a call placed at an undesirable time from being completed. That is, if the first telephone user misreads the display or does not pay attention to the display, the call may still be completed even if occuring at an undesirable time for the recipient of the call. Further, Seppo does not disclose means for determining the time zone of a subscriber to be called who has forwarded calls from a first telephone to a second telephone.

It would be desirable for a communication system to include a means for preventing calls placed during undesirable time periods from being connected, where the undesirable nature of a time period results from a subscriber having forwarded calls or from a mobile subscriber having moved from a first time zone to a second time zone.

SUMMARY OF THE INVENTION

To overcome the above problems, and provide further advantages, the present invention provides for a communication system having means for preventing calls placed at undesirable times from being connected. According to exemplary embodiments, a communications system in which calls can be forwarded from a desired terminal to a new terminal, includes a prevention means for selectively preventing communication connections to a desired or new terminal when the calling communication terminal and the desired terminal are located in different time zones. The prevention means can inform the calling terminal of the local time of the desired or new terminal, and allow the connection to be established only after receiving verification from the calling communication terminal, or can simply prohibit the connection from occuring during certain time periods. Further, the prevention means can be activated during one or more predetermined time periods. The prevention means can be in form of a filter located within a control center, a telecommunications device, or separately from a control center or telecommunications device.

As a result of the present invention, calls placed at times undesirable for the intended recipient can be automatically inhibited or prohibited from being connected to a communication device currently associated with the intended recipient. The invention is particularly useful in systems having call forwarding, mobile communications systems, or systems which incorporate both call forwarding and mobile communications.

BRIEF DESCRIPTION OF THE DRAWINGS

A more complete understanding of the present invention can be obtained upon reading the following Detailed Description of the Preferred Embodiments, along with the accompanying drawings in which like reference indicia indicate like elements, and in which.

DETAILED DESCRIPTION OF THE PREFERRED EMBODIMENTS

Figure 1:
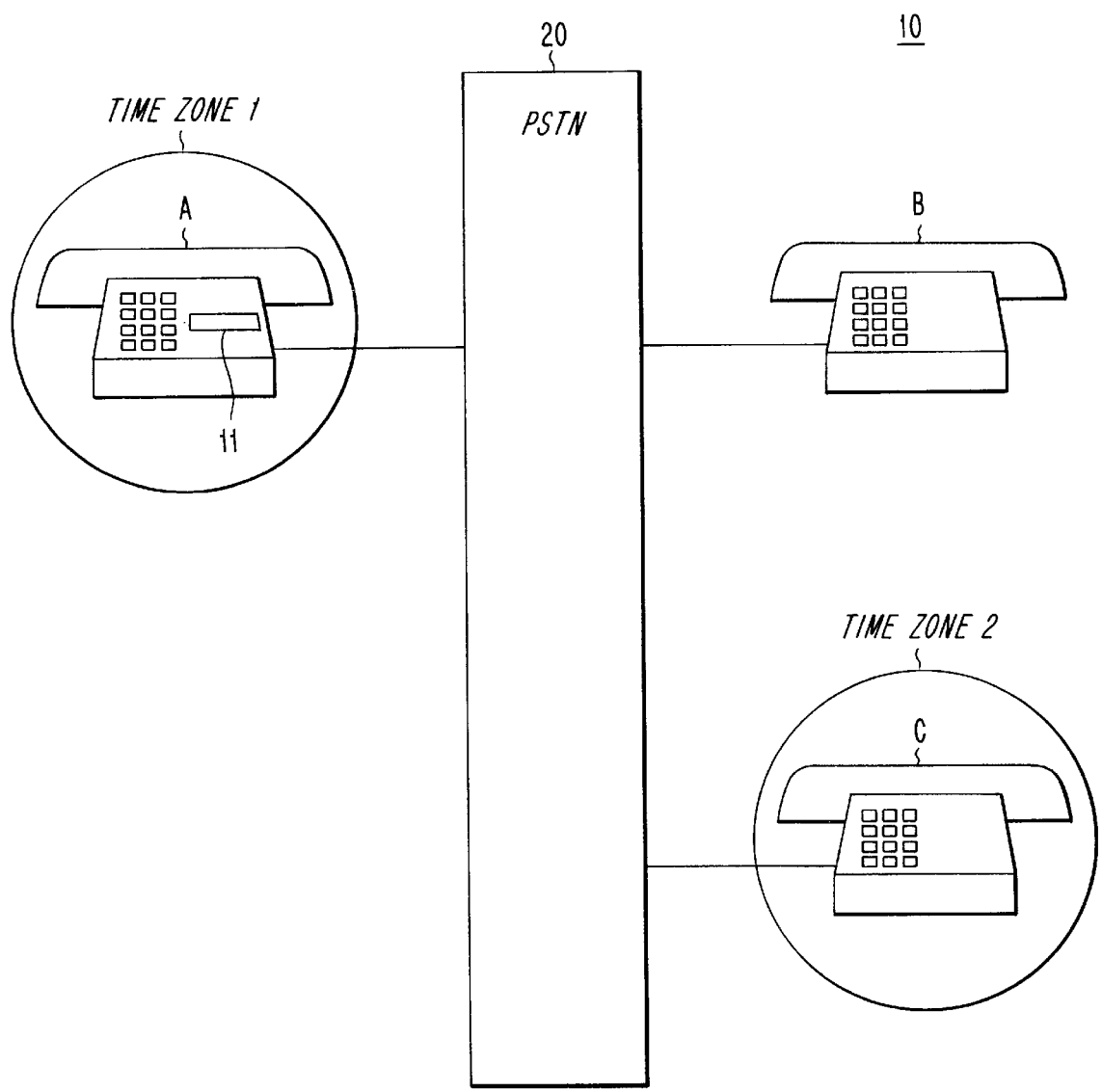
FIG. 1 illustrates a PSTN communication system according to the present invention.

Referring now to FIG. 1, a first communication system 10 suitable for implementing a first embodiment of the present invention is shown. The system comprises a Public Switched Telephone Network (PSTN 20) to which at least three communication terminals labeled A, B and C are connected. The PSTN allows forwarding of calls; that is, it is possible for a subscriber to forward a call from one terminal to another terminal by informing the PSTN 20. If, for example, a first subscriber at terminal A calls a second subscriber at Terminal B and the second subscriber has forwarded incoming calls to terminal C, the PSTN will connect the call to terminal C and not to terminal B.

A first operational aspect of the communication system of FIG. 1 will be discussed using the example above when a first subscriber at terminal A calls a second subscriber at terminal B and the second subscriber has forwarded incoming calls to terminal C. When the first subscriber calls the second subscriber at terminal B, the PSTN 20 determines whether the second subscriber has forwarded calls to another terminal. If the second subscriber has forwarded the call to another terminal (in the current example to terminal C), the PSTN 20 determines, for example from the subscriber identification number associated with terminal C, the local time in the time zone of terminal C (Time Zone 2). The information about the local time in the time zone of terminal C is forwarded to the first subscriber at terminal A where the information is presented for example on a display 11 or as a voice request through a loudspeaker (not shown). The PSTN 20 may now request the first subscriber of terminal A to confirm that the call shall be connected to subscriber C. Optionally, the PSTN 20 may request only that the first subscriber provide a confirmation in cases when the local time of the time zone of terminal C is within a predetermined time range which either is a preset time range of the PSTN or has been set by a subscriber at terminals A, B or C.

A second operational aspect of the communication system of FIG. 1 is exemplified by a first subscriber at terminal A calling a subscriber at terminal C either directly or indirectly by calling terminal B from which incoming calls have been forwarded to terminal C. In a preset phase the subscriber at terminal C has communicated to the PSTN 20 from which time zones and during which time ranges an incoming call should be connected to terminal C and/or from which time zones and during which time ranges an incoming call should not be connected to terminal C. For example, terminal C may allow incoming calls only from subscribers having the same local time of the same time zone as terminal C during a specified time range (e.g., from 11 p.m. to 7 a.m.). In this manner, the subscriber at terminal C prevents subscribers who may not be aware of the local time at terminal C to place a call to terminal C during the night. At the same time, the subscriber at terminal C allows subscribers in the same time zone to place a call at any time. Such subscribers typically can be expected to be aware of the inconvenience their call may cause to the subscriber at terminal C because they are in the same time zone. Such an arrangement allows subscribers in the same time zone as terminal C to place, for example, very important calls at any time of the day.

In a preset phase a subscriber at terminal C communicates to the PSTN 20 restrictions on incoming calls based on the time zone of a calling subscriber. The desired restrictions can be limited to one or more specified periods of time.

When the subscriber at terminal A calls either terminal C directly or calls a subscriber at terminal B who has forwarded incoming calls to terminal C, the PSTN 20 determines whether the subscriber at terminal A calls from a time zone and during a time period which correspond to the restrictions earlier communicated to the PSTN 20 with respect to terminal C. Only if the subscriber at terminal A is calling from a non-restricted time zone and at a non-restricted time will the call be connected to terminal C. Optionally, the calling subscriber at terminal A is informed of the restriction if the call is not connected to terminal C.

Figure 2:
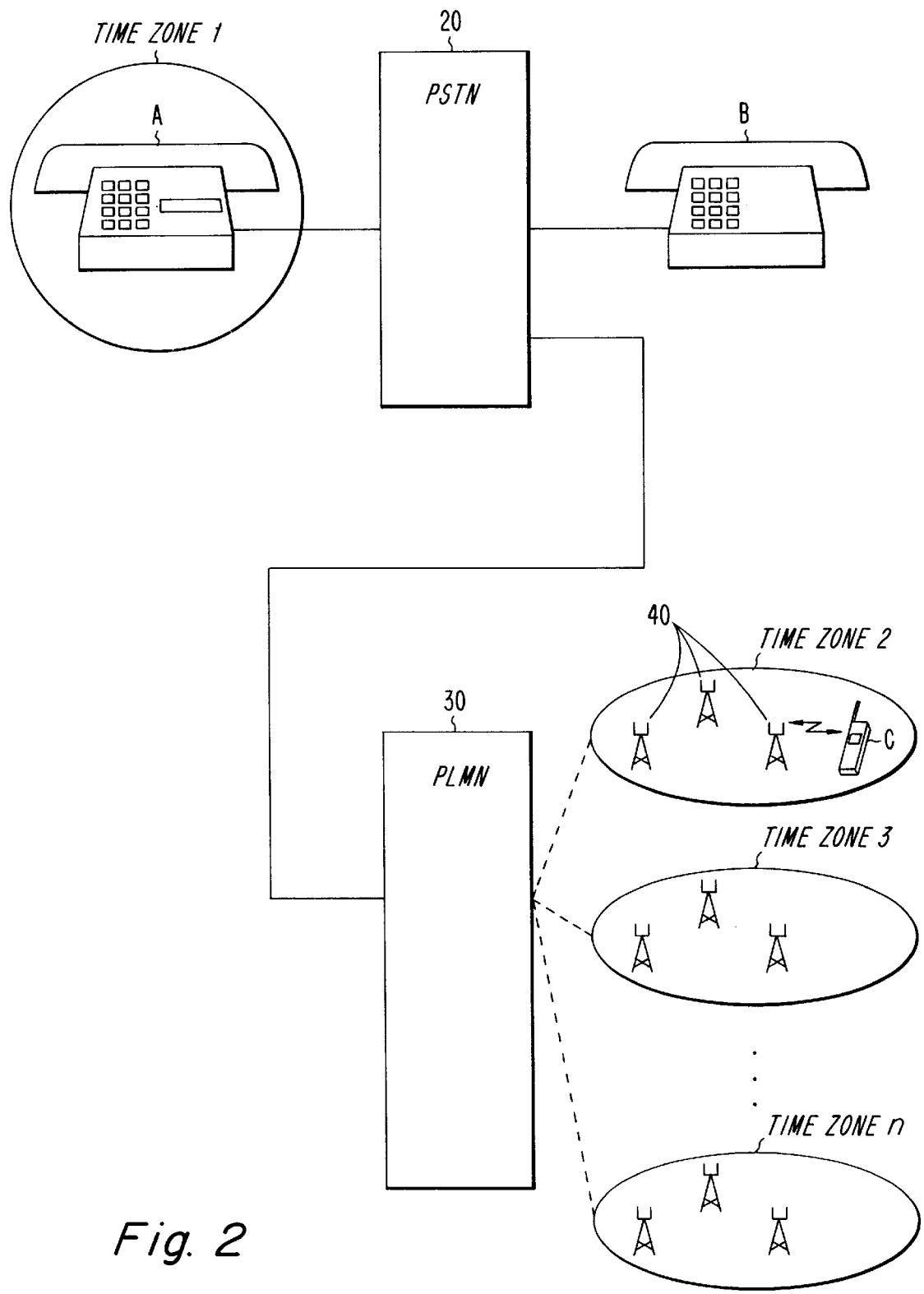
FIG. 2 illustrates a mobile communication system according to the present invention operating in conjunction with the PSTN system of FIG. 1.

FIG. 2 illustrates a second communication system 10 suitable for implementing a second embodiment of the present invention. The system comprises a Public Switched Telephone Network (PSTN) 20 to which at least one Public Land Mobile Network (PLMN) 30 and at least two subscriber terminals labeled A and B, respectively, are connected. The PLMN 30 include a number of base stations 40 which are typically located to cover different geographical areas which may be situated in different time zones (Time Zone 2, Time Zone 3, . . . Time Zone n). Mobile terminals, such as mobile station C in FIG. 2, are in contact within the PLMN. The PSTN allows forwarding of calls, that is, it is possible for a subscriber to forward a call from one terminal to another terminal by informing the PSTN 20 accordingly. If, for example, a first subscriber calls a second subscriber and the second subscriber has forwarded incoming calls to a new terminal, such as mobile terminal C, the PSTN will connect the call to mobile terminal C via the PLMN and not to the second subscriber's original terminal. It should be understood that the PLMN may cover a number of countries on a number of continents and a number of time zones corresponding to different local times.

A first operational aspect of the communication system of FIG. 2 will now be discussed using the example above when the first subscriber at terminal A calls the second subscriber at terminal B who has forwarded incoming calls to new terminal C. When the subscriber at terminal A calls the second subscriber at terminal B the PSTN (20) determines whether or not the subscriber at terminal B has forwarded calls to a new terminal. If the subscriber at terminal B has forwarded the call to a new terminal, in the current example to mobile terminal C, the PSTN (20) determines, for example from a Home Local Register (HLR) (not shown) of the PLMN, the time zone (Time Zone 2) in which mobile terminal C is currently located. The information about the time zone can be provided to the PSTN as part of an identification number of the base station or the base station controller (BSC) (not shown) to which mobile terminal C is assigned. The information about the local time of the time zone of mobile terminal C is forwarded to the first subscriber at terminal A where the information is presented, for example, on a display or as a voice request through a loudspeaker (not shown). The PSTN (20) may now request the first subscriber at terminal A to confirm that the call should be connected to the subscriber at terminal C. Optionally, the PSTN (20) may request the subscriber at terminal A to provide a confirmation only in cases when the local time of the time zone of terminal C is within a predetermined time range, which can be set by the PSTN, the PLMN, or by a subscriber at terminals A, B or C.

A second operational aspect of the communication system of FIG. 2 will now be discussed using the example when a subscriber at terminal A calls a subscriber at mobile terminal C directly. When the subscriber at terminal A calls the subscriber at mobile terminal C the PSTN (20) determines, for example from a Home Local Register (HLR) (not shown) of the PLMN about the time zone (Time Zone 2) in which mobile terminal C is currently located. The information about the time zone can be provided to the PSTN as part of an identification number of the base station or the base station controller (BSC) (not shown) to which mobile terminal C is assigned. The information about the local time of the time zone of mobile terminal C is forwarded to the first subscriber at terminal A where the information is presented, for example, on a display or as a voice request through a loudspeaker (not shown). The PSTN (20) may now request the first subscriber at terminal A to confirm that the call should be connected to the subscriber at terminal C. Optionally, the PSTN (20) may only request the subscriber at terminal A to provide a confirmation only in cases when the local time of the time zone of terminal C is within a predetermined time range, which can be set by the PSTN, the PLMN or by a subscriber at terminal A or C.

A third operational aspect of the communication system of FIG. 2 is exemplified by a subscriber at terminal A calling a subscriber at terminal C either directly or indirectly by calling a subscriber at terminal B who has forwarded incoming calls to terminal C. In a preset phase the subscriber at terminal C can communicate to the PLMN (30) or the PSTN (20) via the PLMN (30) from which time zones and during which time ranges an incoming call should be connected to terminal C and/or from which time zones and during which time ranges an incoming call should not be connected to terminal C. For example, terminal C may allow incoming calls only from subscribers having the same local time of the same time zone as terminal C during a specified time range (e.g., from 11 p.m. to 7 a.m.). In this manner, the subscriber at terminal C prevents subscribers who may not be aware of the local time at terminal C to place a call to terminal C during the night. At the same time, the subscriber at terminal C allows subscribers in the same time zone to place a call at any time. Such subscribers typically can be expected to be aware of the inconvenience their call may cause to the subscriber at terminal C because they are in the same time zone. Such an arrangement allows subscribers in the same time zone as terminal C to place, for example, very important calls at any time of the day.

In a preset phase, a subscriber at terminal C can communicate to the PLMN 30 or the PSTN 20 via the PLMN 30 desired restrictions on incoming calls based on the time zone of a calling subscriber. The desired restrictions can be limited to one or more specified periods of time.

When the subscriber at terminal A calls either terminal C directly or calls a subscriber at terminal B who has forwarded incoming calls to terminal C, the PLMN 30 and/or the PSTN 20 determines whether the subscriber at terminal A is calling from a time zone and during a time period which correspond to the restrictions earlier communicated to the PLMN 30 and/or PSTN 20 with respect to terminal C. Only if the subscriber at terminal A is calling from a non-restricted time zone and a non-restricted time will the call be connected to terminal C. Optionally, the calling subscriber at terminal A can be informed of the restriction if the call is not connected to terminal C.

A fourth operational aspect of the communication system of FIG. 2 will be discussed using as an example the situation when a subscriber at mobile terminal C calls terminal B, calls to which have been forwarded to terminal A. When the subscriber at mobile terminal C calls terminal B, the PSTN 20 determines if calls to terminal B have been forwarded to another subscriber or not. If calls to terminal B have been forwarded to another subscriber, in the current example to terminal A, the PSTN 20 determines, for example from the subscriber identification number of terminal A, the local time of the time zone of terminal A (Time Zone 1). The information about the local time of the time zone of terminal A is forwarded to mobile terminal C via the PLMN 30 and the information is presented to mobile terminal C, for example on a display or as a voice request through a loudspeaker (not shown). The PSTN 20 via PLMN 30 may now request the subscriber at terminal C to confirm that the call should be connected to subscriber A. Optionally, the PSTN 20 may request a confirmation only in cases when the local time of the time zone of terminal C is within a predetermined time range which can be preset by the PSTN, on the PLMN, or set by a subscriber at terminals A, B or C.

A fifth operational aspect of the communication system of FIG. 2 is exemplified by a subscriber at mobile terminal C calling a subscriber at terminal A either directly, or indirectly by calling terminal B with incoming calls forwarded to terminal A. In a preset phase, the subscriber at terminal A has communicated to the PSTN (20) from which time zones and during which time ranges an incoming call should be connected to terminal A and/or from which time zones and during which time ranges an incoming call should not be connected to terminal A. For example, terminal A may allow incoming calls only from subscribers in the same time zone as terminal A during the time range from 11 p.m. to 7 a.m.. In this manner, the subscriber at terminal A prevents subscribers who may not be aware of the local time at terminal A to place a call to terminal A during the night. At the same time, calls from a subscriber in the same time zone are allowed at any time. Such subscribers typically can be expected to be aware of the inconvenience their call may cause to the subscriber at terminal A because they are in the same time zone as terminal A. Such an arrangement allows subscribers in the same time zone as terminal A to place very important calls at any time of day.

In a preset phase, a subscriber at terminal A communicates to the PSTN 20 desired restrictions on incoming calls based on the time zone of a calling subscriber. The desired restrictions can be limited to one or more specified periods of time.

When the subscriber at mobile terminal C calls terminal A directly, or calls terminal B when incoming calls are forwarded to terminal A, the PLMN 30 and/or the PSTN 20 determine whether the call from mobile terminal C comes from a restricted time zone and during a restricted time period. Only if the subscriber at mobile terminal C is calling from a non-restricted time zone and at a non-restricted time will the call be connected to terminal A. Optionally, the calling subscriber at mobile terminal C is informed of the restriction if the call is not connected to terminal A.

Figure 3:
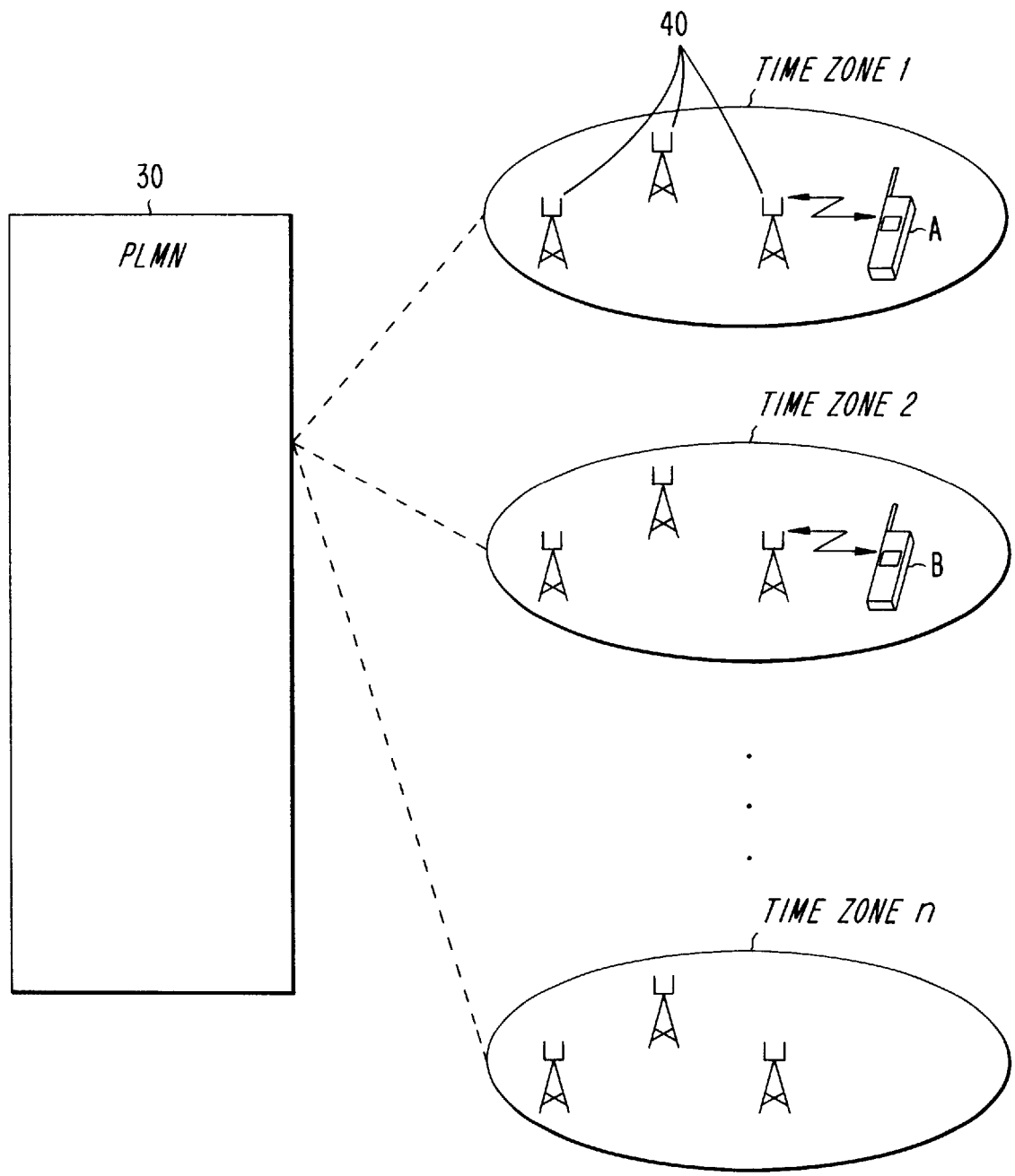
FIG. 3 illustrates a mobile communication system according to the present invention.

FIG. 3 illustrates a communication system 10 suitable for implementing a third embodiment of the present invention. The system includes a Public Land Mobile Network (PLMN) 30 to which at least two terminals labeled A and B, respectively, are connected. The PLMN 30 includes a number of base stations 40 which are positioned to cover different geographical areas which may include different time zones (Time Zone 2, Time Zone 3, . . . Time Zone n).

Mobile stations, such as terminals A, B and C in FIG. 3, are in contact within the PLMN. It should be understood that the PLMN may include a number of countries on a number of continents and a number of time zones corresponding to different local times.

In a first operational aspect of the communication system of FIG. 3, a subscriber at mobile terminal A calls the subscriber at mobile terminal B. The PLMN 30 determines from, e.g., a Home Local Register (HLR) (not shown) of the PLMN, the time zone (Time Zone 2) in which mobile terminal B is currently located. The information about the time zone can be represented as a part of an identification number of the base station or the base station controller (BSC) (not shown) to which mobile terminal B is assigned. The information about the local time of the time zone of mobile terminal B is forwarded to mobile terminal A where the information is presented, for example, on a display or as a voice request through a loudspeaker (not shown). The PLMN 30 may now request the subscriber at mobile terminal A to confirm that the call should be connected to the subscriber at mobile terminal B. Optionally, the PLMN 30 may request confirmation only in cases when the local time of the time zone of terminal B is within a predetermined time range, which can be a preset time range of the PLMN or can be a range set by a subscriber at terminal A or B.

A second operational aspect of the communication system of FIG. 3 is exemplified by a subscriber at mobile terminal A calling a subscriber at mobile terminal B. In a preset phase, the subscriber at mobile terminal B communicates to the PLMN 30 from which time zones and during which time ranges an incoming call should be connected to mobile terminal B and/or from which time zones and during which time ranges an incoming call should not be connected to mobile terminal B. For example, the subscriber at mobile terminal B may allow incoming calls only from subscribers in the same time zone as mobile terminal B during a specified time range; e.g., from 11 p.m. to 7 a.m.. In this manner, the subscriber at mobile terminal B prevents subscribers who may not be aware of the local time at mobile terminal B to place a call to mobile terminal B during the night. At the same time, the subscriber at mobile terminal B allows subscribers in the same time zone to call at any time. Such subscribers can typically be expected to be aware of the inconvenience their call may cause the subscriber at mobile terminal B because they are in the same time zone as mobile terminal B. In fact, such an arrangement allows subscribers in the same time zone as mobile terminal B to place, for example, very important calls independently of the time of day.

In a preset phase, the subscriber at mobile terminal B communicates to the PLMN 30 desired restrictions on incoming calls based on the time zone of a calling subscriber. The desired restrictions can be limited to one or more specified periods of time.

When the subscriber at mobile terminal A calls the subscriber at mobile terminal B, the PLMN 30 checks whether the call originates from a restricted time zone and during a restricted time period. Only if the subscriber at mobile terminal A is calling from a non-restricted time zone and at a non-restricted time will the call be connected to mobile terminal B. The calling subscriber can be informed of the restriction if the call is not connected to mobile terminal B.

Figure 4:
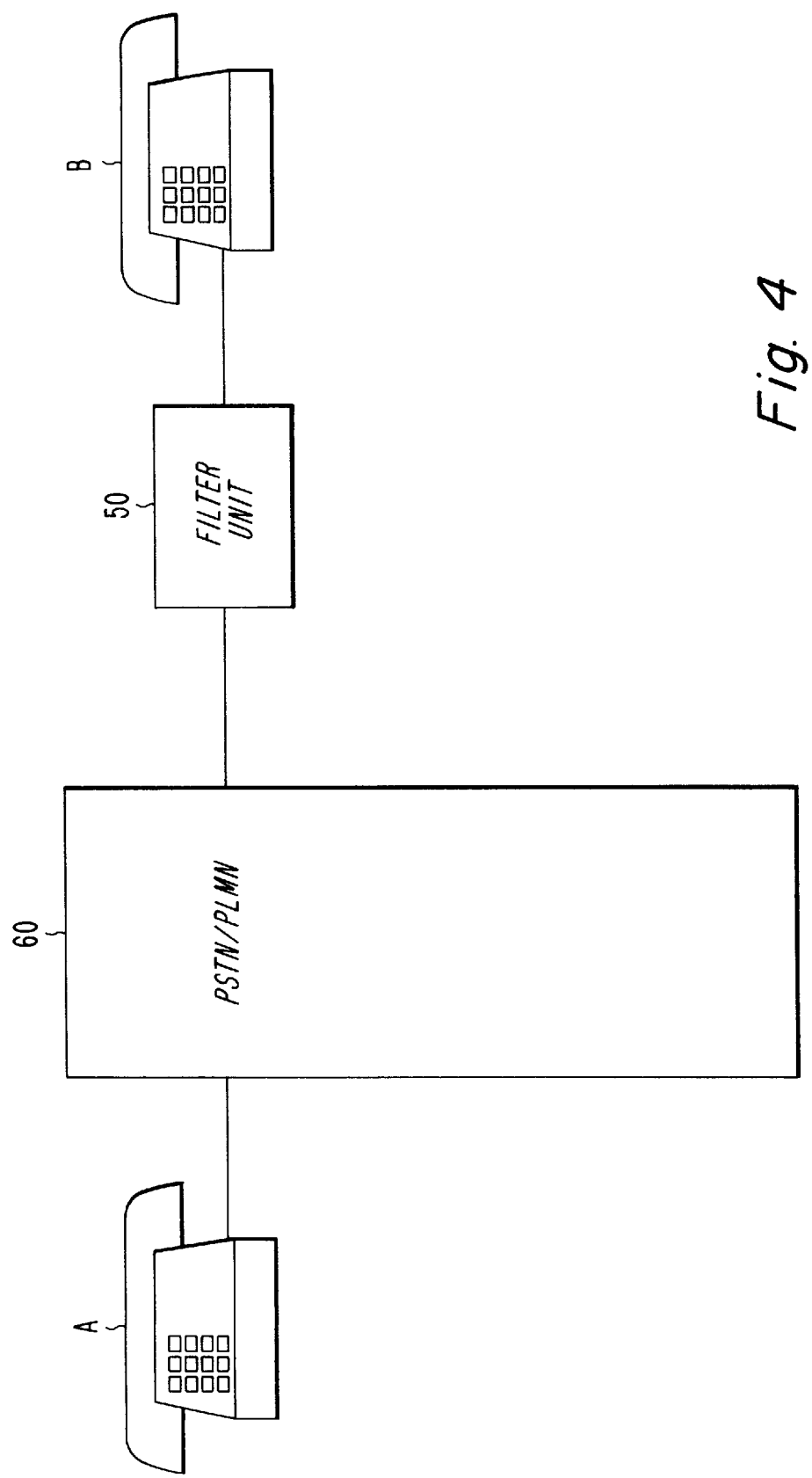
FIG. 4 is a communication system according to the present invention.

FIG. 4 illustrates a communication system (10) according to a fourth embodiment of the present invention. The system includes a Public Land Mobile Network (PLMN) and/or a Public Switched Telephone Network, PSTN 60 to which at least two terminals labeled A and B, respectively, are connected. In this case a filter unit 50 is connected between terminal B and the PLMN/PSTN.

In operation when a subscriber at terminal A calls a subscriber at terminal B, the filter unit 50 answers the call and informs the calling subscriber by a voice message of the local time of the subscriber at terminal B. The filter unit may also inform the calling subscriber that the call can be connected only if the calling subscriber gives a predetermined voice message or activates a certain key or key sequence at terminal A. In this case, and if the calling subscriber provides the predetermined voice message or activates the correct key or keys, the call will be connected to terminal B.

Assume that a first subscriber has enabled the filter and set the period to block incoming calls between 10 pm and 8 am. A second subscriber calling the first subscriber in the period between 10 pm and 8 am will receive a message (on a display or as a voice message) that the filter is active. The second subscriber can then "override" the filter by simply holding the line for a predetermined period of time (e.g. 3 seconds). Alternatively the second subscriber is connected to an answering machine or an answering service in the PLMN/PSTN where he can leave a message. This connection may be made dependent on a signal, such as the activating of a key or a voice message, from the second subscriber.

It should be understood that the filter unit 50 may be programmed by the subscriber at terminal B to inform a calling subscriber about the local time only during preset time intervals.

Furthermore, the filter unit 50 may be programmed to the subscriber at terminal B to allow a call to be connected when the calling subscriber provides the required voice message or activates the required key or keys only during preset time intervals. If the filter unit 50 is set in this mode, the terminal unit (phone) may be used as the required input/output device or the filter unit 50 may be provided with its own input/output device. It should be understood that the filter unit may be built into the PSTN and/or the PLMN or it may be built into the terminal unit (phone) or it may be realized as a separate unit which a subscriber connects between the socket for his connections to the PSTN and his terminal unit. The filter unit may comprise a real-time clock as a base for the local time or it may receive the local time from the PSTN and/or the PLMN. In an alternative embodiment, the filter unit 50 as discussed above may be built into a mobile phone.

While the foregoing description includes many details and specificities, it is to be understood that these are for purposes of illustration only, and are not to be construed as limitations of the invention. Numerous modifications will be readily apparent to those of ordinary skill in the art which do not depart from the scope and spirit of the invention, as defined by the following claims and their legal equivalents.

What is claimed is:

1. A telecommunications system, comprising:
   a plurality of communication terminals;
   a telecommunications control center for establishing communication connections between two or more of the plurality of communication terminals, the telecommunications center including call forwarding means for forwarding a communication connection intended for a desired communication terminal to a new communication terminal in response to a control request from a subscriber associated with the desired communication terminal; and prevention means for selectively preventing communication connections to the desired communication terminal or new communication terminal from a calling communication terminal when the prevention means determines that the calling communication terminal is located in a different time zone than the desired communication terminal or the new communication terminal.

2. The system of claim 1, wherein the prevention means informs the calling communication terminal of the local time of the desired or new communication terminal, and allows the communication connection to be established after receiving a verification signal from the calling communication terminal.

3. The system of claim 2, wherein the prevention means receives a request for a communication connection from the calling terminal, determines from a memory means the local time of the desired or new terminal, and informs the calling terminal of the local time of the desired or new terminal.

4. The system of claim 3, wherein the memory means is a home local register of a public land mobile network.

5. The system of claim 4, wherein the local time information in the home local register is derived from an identification number of a base station or base station controller in the public land mobile network.

6. The system of claim 1, wherein the prevention means is activated and operable only during one or more predetermined time ranges.

7. The system of claim 6, wherein the prevention means allows communication connections to the new or desired communication terminal during the predetermined time range when the calling communication terminal is located in the same time zone as the new or desired communication terminal.

8. The system of claim 1, wherein at least one of the calling terminal, desired terminal, and new terminal is a mobile telecommunications device.

9. The system of claim 1, wherein the telecommunications control center includes the public switched telephone network.

10. The system of claim 9, wherein the telecommunications control center further includes at least one public land mobile network.

11. The system of claim 1, wherein the prevention means informs the calling terminal that the communication connection with the desired or new communication terminal is prohibited.

12. The system of claim 1, wherein the prevention means is incorporated within the telecommunications control center.

13. The system of claim 1, wherein the prevention means is incorporated within the desired communication terminal.

14. The system of claim 1, wherein the prevention means is incorporated within an independent device which is independent of the calling terminal, desired terminal, new terminal, or control center.

15. A filtering device for selectively preventing communication connections from being established in a communication system, the filtering device comprising:

means for exchanging communication signals with a destination communication terminal; and
means for exchanging communication signals with the communication system,
wherein the filtering device selectively prevents a communication connection from being established between a calling communication terminal and the destination communication terminal when the filtering device determines that the calling communication terminal and the destination communication terminal are located in different time zones.

16. The device of claim 15, wherein the filtering device is incorporated within a control center of the communication system.

17. The device of claim 15, wherein the filtering device is incorporated within the calling communication terminal or the destination communication terminal.

18. The device of claim 15, wherein the filtering device is located independently of the calling terminal, destination terminal, and a control center of the communication system.

19. The device of claim 15, wherein at least one of the calling terminal and destination terminal is a mobile communication terminal.

20. The device of claim 15, wherein the filtering device informs the calling communication terminal of the local time of the destination terminal, and allows the communication connection to be established upon receiving a verification signal from the calling communication terminal.

21. The device of claim 20, wherein the filtering device receives a request for a communication connection from the calling terminal, determines from a memory means the local time of the destination terminal, and informs the calling terminal of the local time of the desired or new terminal.

22. The device of claim 21, wherein the memory means is a home local register of a public land mobile network.

23. The device of claim 22, wherein local time information in the home local register is derived from an identification number of a base station or base station controller in the public land mobile network.

24. The device of claim 15, wherein the filtering device is activated and operable only during one or more predetermined time periods.

25. The device of claim 24, wherein the filtering device allows communication connections to the destination terminal during one of the one or more predetermined time periods when the calling communication terminal is located in the same time zone as the desired terminal.

26. The device of claim 15, wherein the communication system includes means for forwarding calls from a first destination terminal to a second destination terminal.

27. The device of claim 15, wherein the filtering device informs the calling terminal that the communication connection with the destination communication terminal is prohibited.

28. The device of claim 15, wherein the filtering device is incorporated within a conventional telephone.

29. The device of claim 15, wherein the filtering device is incorporated within a mobile telephone.

* * * * *